(12) United States Patent
Benisty

(10) Patent No.: US 11,893,253 B1
(45) Date of Patent: Feb. 6, 2024

(54) DYNAMIC TD-PPM STATE AND DIE MAPPING IN MULTI-NAND CHANNELS

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/949,127

(22) Filed: Sep. 20, 2022

(51) Int. Cl.
*G06F 12/00* (2006.01)
*G06F 3/06* (2006.01)

(52) U.S. Cl.
CPC .......... *G06F 3/0635* (2013.01); *G06F 3/0604* (2013.01); *G06F 3/0659* (2013.01); *G06F 3/0679* (2013.01)

(58) Field of Classification Search
CPC .... G06F 3/0635; G06F 3/0604; G06F 3/0659; G06F 3/0679
See application file for complete search history.

(56) References Cited

U.S. PATENT DOCUMENTS

| | | | |
|---|---|---|---|
| 10,013,345 B2 | 7/2018 | Erez et al. | |
| 10,095,412 B2 | 10/2018 | Hsu et al. | |
| 10,365,703 B2 | 7/2019 | Ha et al. | |
| 10,712,955 B2 | 7/2020 | Jeon et al. | |
| 10,831,384 B2 | 11/2020 | Myers et al. | |
| 11,029,746 B2 | 6/2021 | Cariello et al. | |
| 11,209,998 B2 * | 12/2021 | Bahar | G06F 3/0605 |
| 11,373,710 B1 | 6/2022 | Hsu et al. | |
| 2002/0048826 A1 * | 4/2002 | Richmond, II | G01R 31/287 438/14 |
| 2009/0276565 A1 * | 11/2009 | Fujibayashi | G06F 3/067 711/E12.019 |
| 2014/0075133 A1 * | 3/2014 | Li | G11C 16/30 711/154 |
| 2014/0112079 A1 | 4/2014 | Wakrat et al. | |
| 2015/0235677 A1 | 8/2015 | Grunzke | |
| 2016/0306592 A1 * | 10/2016 | Oh | G06F 3/0653 |
| 2017/0003889 A1 * | 1/2017 | Kim | G06F 3/0659 |
| 2019/0065089 A1 | 2/2019 | Myers et al. | |
| 2019/0126047 A1 * | 5/2019 | Kassiri Bidhendi | A61B 5/14546 |
| 2019/0341370 A1 * | 11/2019 | Keeth | H01L 25/0657 |
| 2020/0183622 A1 * | 6/2020 | Hubbard | G06F 3/061 |
| 2021/0124511 A1 | 4/2021 | Cariello et al. | |
| 2021/0255799 A1 * | 8/2021 | Kale | G06N 3/049 |
| 2021/0286532 A1 * | 9/2021 | Palmer | G11C 5/143 |

(Continued)

*Primary Examiner* — Shawn X Gu
*Assistant Examiner* — Mohammad S Hasan
(74) *Attorney, Agent, or Firm* — PATTERSON + SHERIDAN, LLP; Steven H. VerSteeg

(57) ABSTRACT

A data storage device includes a memory device and a controller coupled to the memory device. The controller and the memory device communicate using a plurality of flash channels, where each channel is mapped to one or more dies of the memory device. Each of the one or more dies of the memory device are associated with one or more strobes of a strobe cycle of a respective flash channel, where a die is provided power during a respective strobe. The controller is configured to, using a time division peak power management (TD-PPM) operation, change an association of a strobe from a first channel to a strobe of a second channel, which may adjust an amount of power provided to each of the channels and improve performance and latency of the data storage device.

20 Claims, 10 Drawing Sheets

(56) References Cited

U.S. PATENT DOCUMENTS

| | | |
|---|---|---|
| 2021/0303209 A1 | 9/2021 | Chun |
| 2021/0382804 A1 | 12/2021 | Alrod et al. |
| 2022/0172767 A1 | 6/2022 | Yu et al. |
| 2022/0173064 A1* | 6/2022 | Somma ................ H05K 7/1061 |
| 2022/0291839 A1* | 9/2022 | Sharma ................ G06F 3/0616 |
| 2023/0195317 A1* | 6/2023 | Yu ........................ G06F 3/0659 |
| | | 711/154 |

* cited by examiner

DYNAMIC TD-PPM STATE AND DIE MAPPING IN MULTI-NAND CHANNELS

BACKGROUND OF THE DISCLOSURE

Field of the Disclosure

Embodiments of the present disclosure generally relate to data storage devices, such as solid state drives (SSDs), and, more specifically, performing time division peak power management (TD-PPM) operations.

Description of the Related Art

Time division peak power management (TD-PPM) is a feature in data storage devices dealing with the strobe cycles sent between a controller of the data storage device and a memory device of the data storage device. TD-PPM is a feature to help improve peak power management. During the operation of the memory device, there are points in time where the memory device consumes a temporary higher peak power. For example, when two or more dies are accessed at the same time or during the same strobe of the strobe cycle, the power usage may peak temporarily. The power management system of the data storage device operation may need to take into consideration that power peaks from the usage of several dies may occur at the same time and develop a power management scheme to minimize the risk of the data storage device consuming a greater amount of power than allowed.

Therefore, there is a need in the art to leverage the TD-PPM feature to optimize a power usage of the data storage device.

SUMMARY OF THE DISCLOSURE

The present disclosure generally relates to data storage devices, such as solid state drives (SSDs), and, more specifically, performing time division peak power management (TD-PPM) operations. A data storage device includes a memory device and a controller coupled to the memory device. The controller and the memory device communicate using a plurality of flash channels, where each channel is mapped to one or more dies of the memory device. Each of the one or more dies of the memory device are associated with one or more strobes of a strobe cycle of a respective flash channel, where a die is provided power during a respective strobe. The controller is configured to, using a time division peak power management (TD-PPM) operation, change an association of a strobe from a first channel to a strobe of a second channel, which may adjust an amount of power provided to each of the channels and improve performance and latency of the data storage device.

In one embodiment, a data storage device includes a memory device having a plurality of dies and a controller coupled to the memory device. The coupling includes a plurality of channels. Each channel of the plurality of channels includes a strobe cycle having a plurality of strobes. Each channel is associated with a distinct one or more dies of the plurality of dies. The distinct one or more dies of the plurality of dies are associated with one or more strobes of the plurality of strobes of a strobe cycle. The controller is configured to determine that a first channel requires additional power for one or more dies of the first channel, determine that a second channel has unused power for one or more dies of the second channel, where one or more strobes associated with the one or more dies of the second channel are distinct from one or more strobes associated with the one or more dies of the first channel, and remap the unused power from the second channel to the first channel.

In another embodiment, a data storage device includes a memory device having a plurality of dies and a controller coupled to the memory device. The coupling includes a plurality of channels. Each channel of the plurality of channels includes a strobe cycle having a plurality of strobes. Each channel is associated with a distinct one or more dies of the plurality of dies. The distinct one or more dies of the plurality of dies are associated with one or more strobes of the plurality of strobes of a strobe cycle. The controller is configured to detect a change in a workload of the data storage device, adjust one or more time division peak power management (TD-PPM) parameters, issue a set feature command to a flash interface module (FIM), and operate the plurality of channels using the adjusted one or more TD-PPM parameters.

In another embodiment, a data storage device includes memory means and a controller coupled to the memory means. The controller is configured to change an association of a first strobe of a strobe cycle of a first channel associated with a first die of the first channel to a first strobe of the strobe cycle of a second channel associated with a first die of the second channel.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, performing time division peak power management (TD-PPM) operations. A data storage device includes a memory device and a controller coupled to the memory device. The controller and the memory device communicate using a plurality of flash channels, where each channel is mapped to one or more dies of the memory device. Each of the one or more dies of the memory device are associated with one or more strobes of a strobe cycle of a respective flash channel, where a die is provided power during a respective strobe. The controller is configured to, using a time division peak power management (TD-PPM) operation, change an association of a strobe from a first channel to a strobe of a second channel, which may adjust an amount of power provided to each of the channels and improve performance and latency of the data storage device.

Figure 1:
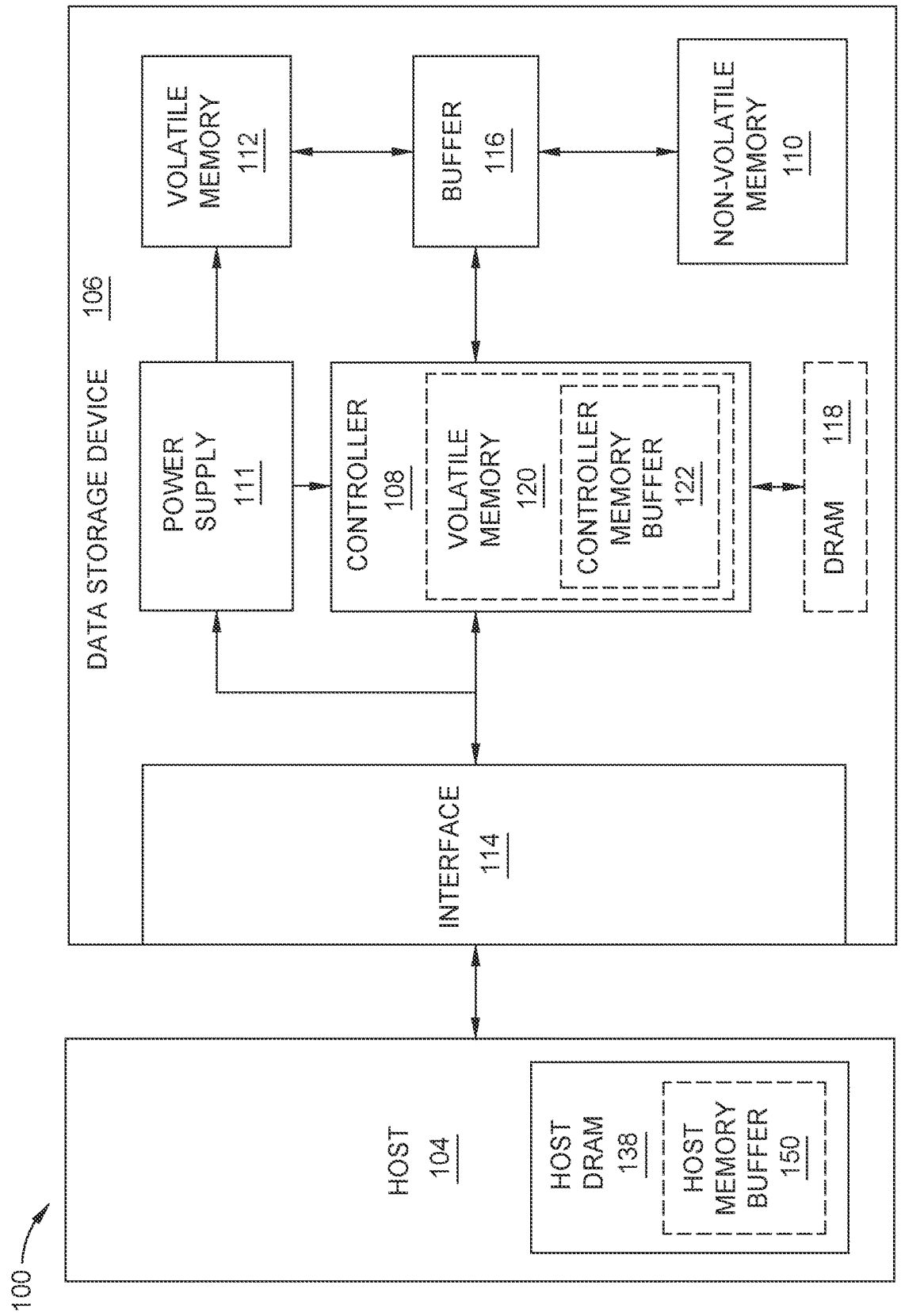
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
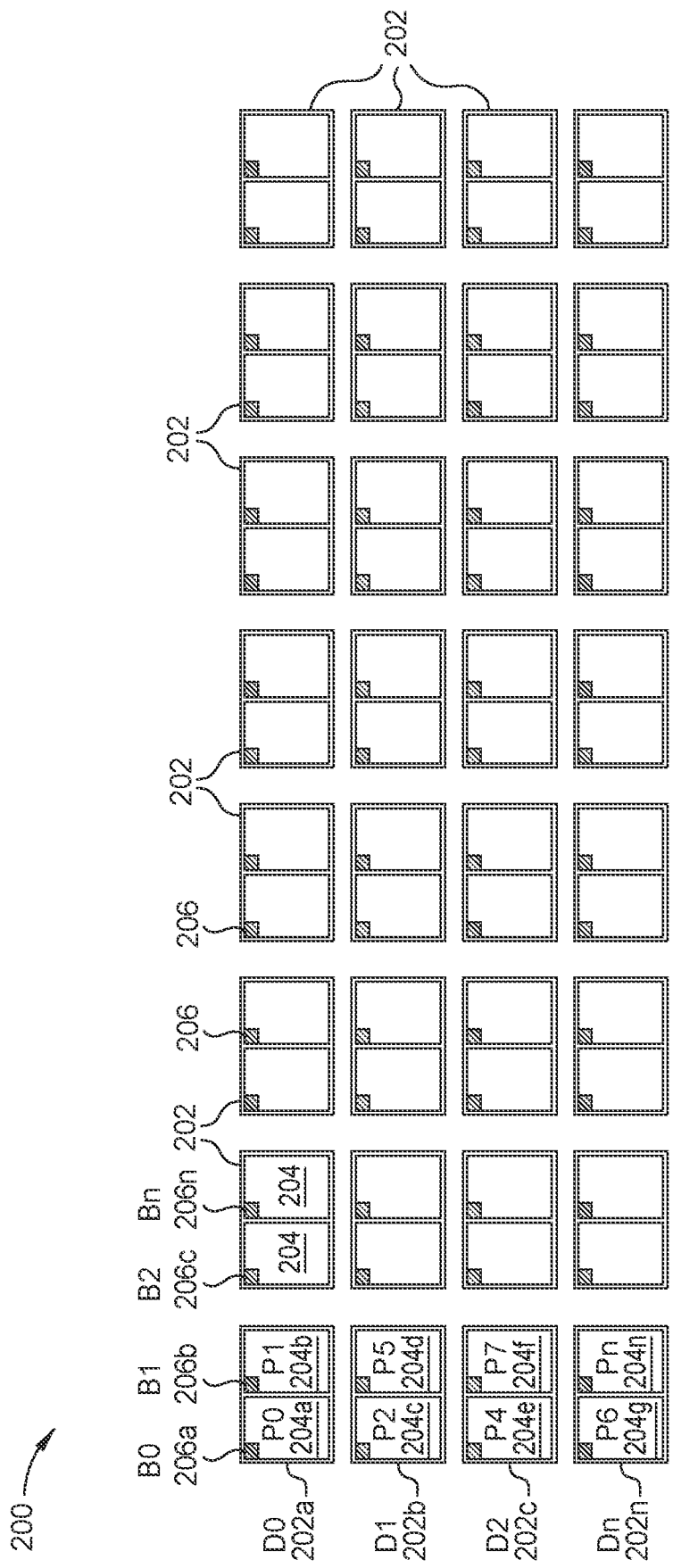
FIG. 2 is an illustration of a memory device, according to certain embodiments.

FIG. 2 is an illustration of a memory device 200, which may be the NVM 110 of FIG. 1, according to certain embodiments. The memory device 200 includes a plurality of dies 202a-202n, collectively referred to as dies 202, where each die of the plurality of dies 202a-202n includes a first plane 204a and a second plane 204b, collectively referred to as planes 204. Each of the planes 204 includes a plurality of blocks 206a-206n, collectively referred to as block 206. While 32 dies 502 are shown in the memory device 200, any number of dies may be included. Furthermore, the dies 202 may be split into a plurality of sets of dies, where each sets of dies has one or more distinct dies of the plurality of dies 202a-202n. For example, a first die 202a may be in a first set of dies and a second set of dies may include a second die 202b and a third die 202c. Each of the sets of dies may be associated with a flash channel of a controller, such as the controller 108 of FIG. 1, where the controller includes a flash interface module (FIM). The FIM may be configured to read data from and write data to the memory device 200, where commands are sent via a respective flash channel program data to a respective die the memory device 200 or read data from a respective die of the memory device 200.

Figure 3:
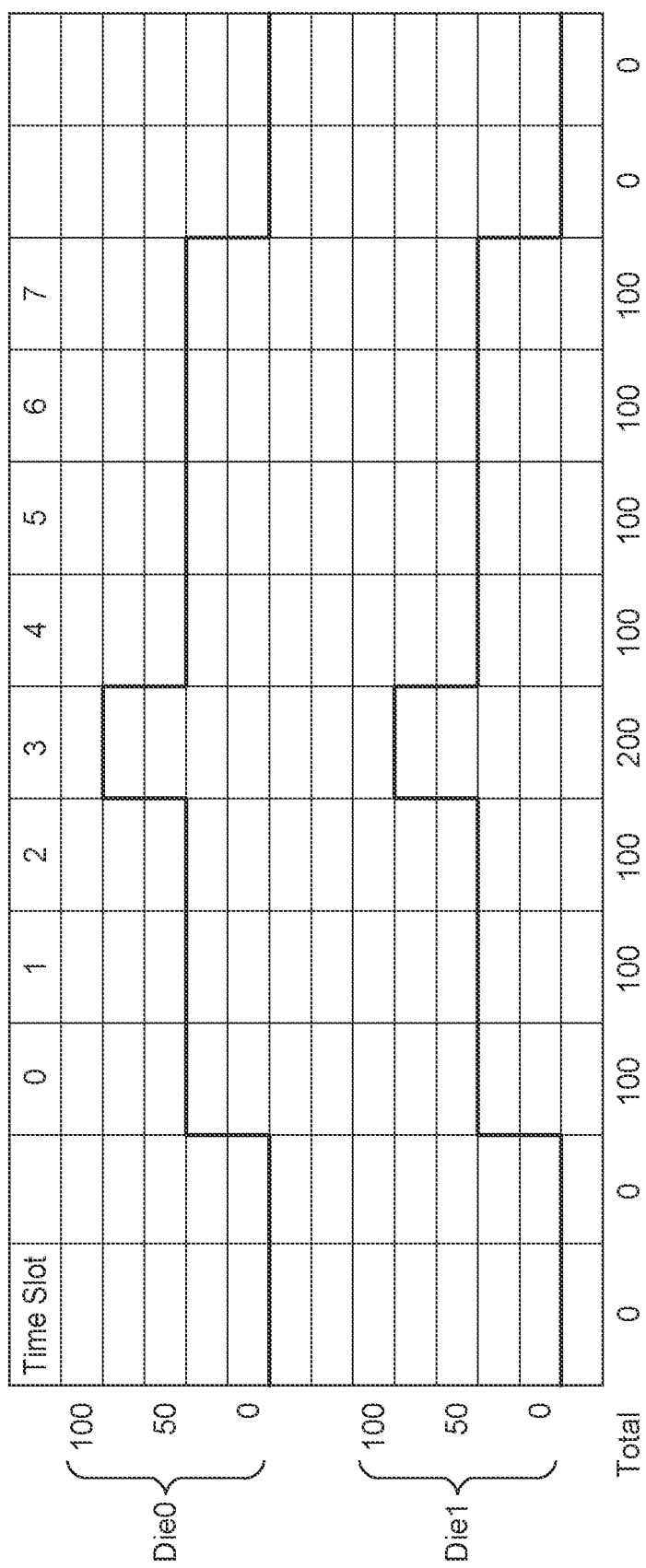
FIG. 3 is an exemplary illustration of die power consumption, according to certain embodiments.

FIG. 3 is an exemplary illustration of die power consumption, according to certain embodiments. FIG. 3 shows a first die (Die0) and a second die (Die1) and a power usage per strobe (time slot), where Die0 and Die1 may be dies of an NVM, such as the NVM 110 of the data storage device 106 of FIG. 1. From time 0 to time 2, Die0 has a power usage of 50 mW. At time 3, Die0 has a power usage of 100 mw. At time 4 to time 7, Die0 has a power usage of 50 mW. From time 0 to time 2, Die1 has a power usage of 50 mW. At time 3, Die1 has a power usage of 100 mw. At time 4 to time 7, Die1 has a power usage of 50 mW. From time 0 to time 2 and time 4 to time 7, the total power usage is 100 mW per time slot. At time 3, the total power usage peaks at 200 mW per time slot. Although FIG. 3 illustrates two dies, the described embodiments may be applicable to greater than two dies. Thus, when multiple dies have converging peak power usage at the same time slot, the overall power usage of the data storage device 106 may reach or exceed a total allotted power usage or an allowed power consumption amount.

Figure 4:
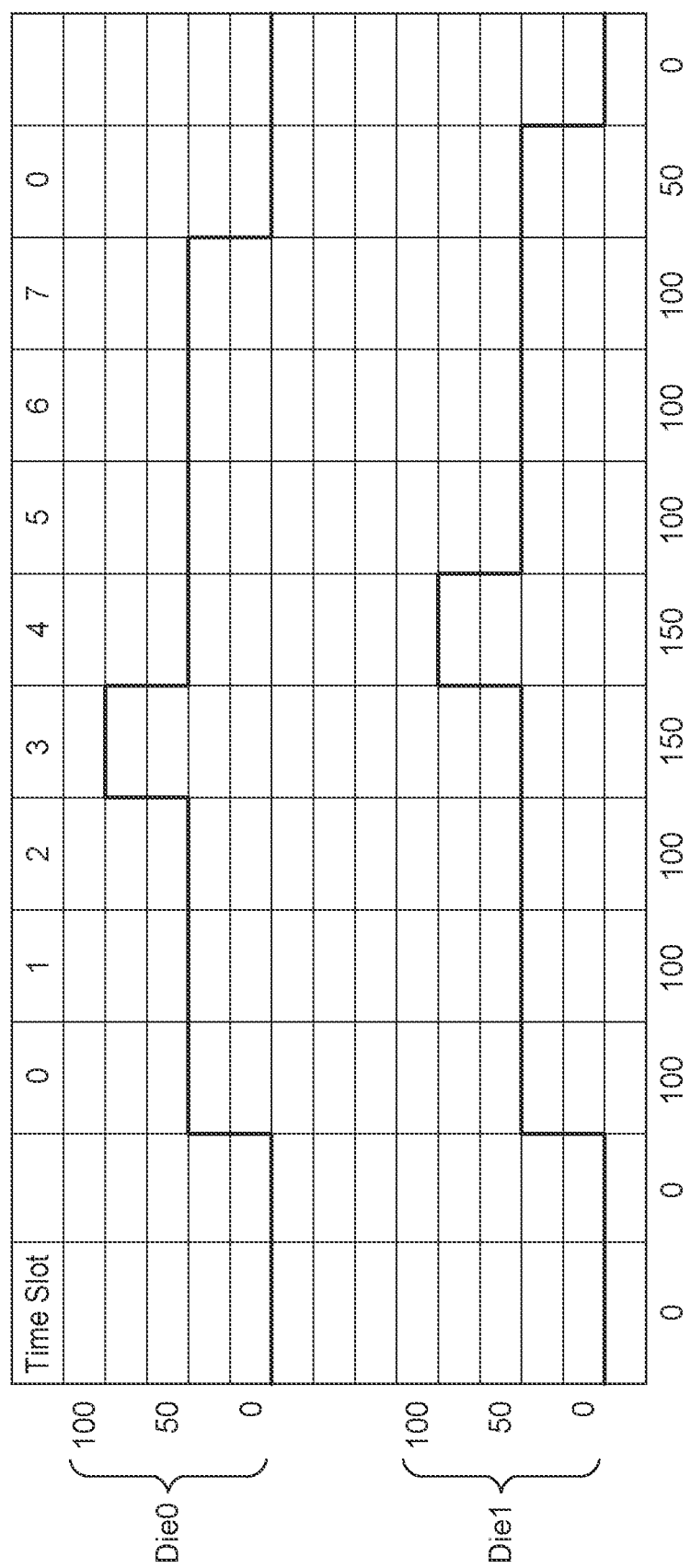
FIG. 4 is an exemplary illustration of die power consumption, according to certain embodiments.

FIG. 4 is an exemplary illustration of die power consumption, according to certain embodiments. FIG. 4 shows a first die (Die0) and a second die (Die1) and a power usage per strobe (time slot), where Die0 and Die1 may be dies of an NVM, such as the NVM 110 of the data storage device 106 of FIG. 1. From time 0 to time 2, Die0 has a power usage of 50 mW. At time 3, Die0 has a power usage of 100 mw. At time 4 to time 7, Die0 has a power usage of 50 mW. At time 7 to time 0, Die0 has a power usage of 0 mW. From time 0 to time 3, Die1 has a power usage of 50 mW. At time 4, Die1 has a power usage of 100 mw. At time 5 to time 7, Die1 has a power usage of 50 mW. At time 7 to time 0, Die1 has a power usage of 50 mW. From time 0 to time 2 and time 5 to time 7, the total power usage is 100 mW per time slot. At time 3 to time 4, the total power usage peaks at 150 mW per time slot. At time 4 to time 5, the total power usage is 150 mW. At time 7 to time 0, the total power usage is 50 mW. Although FIG. 4 illustrates two dies, the described embodiments may be applicable to greater than two dies.

By using a time division peak power management (TD-PPM) feature, a controller, such as the controller 108, may cause Die0 and Die1 to not peak in power usage during the same time slot so that the total power usage for a time slot does not exceed a threshold total power usage. In other words, the controller 108 may set an allowed power usage of each die per time slot. In other words, referring back to FIG. 4, the controller 108 may allow Die0 to consume the peak power at time 3 and Die1 to consume the peak power at time 4.

Figure 5:
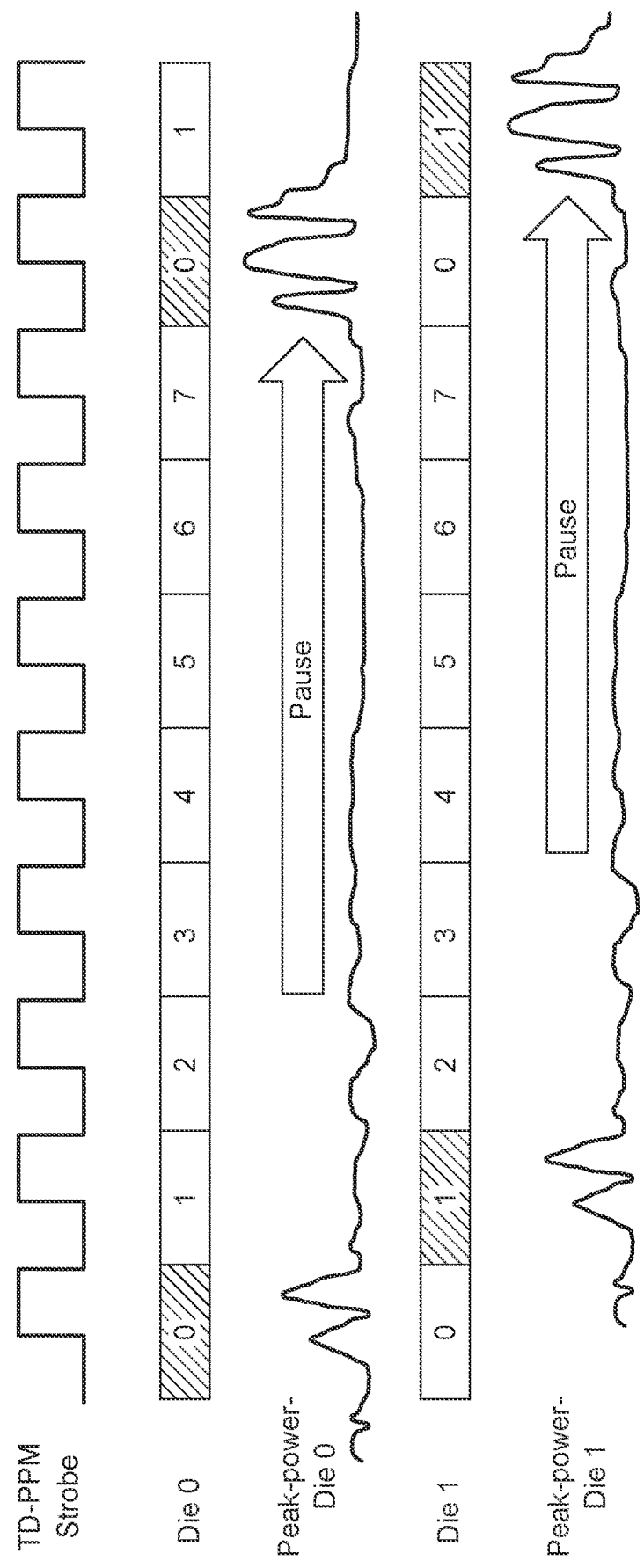
FIG. 5 is an exemplary illustration of a data storage device having the TD-PPM feature, according to certain embodiments.

FIG. 5 is an exemplary illustration of a data storage device, such as the data storage device 106, having the TD-PPM feature, according to certain embodiments. For exemplary purposes, the storage system 100 of FIG. 1 may be referenced herein. The controller 108 drives the strobe (or clock) in order to notify the NVM 110 when to switch to the next TD-PPM time slot. Each die is statically associated with one or more TD-PPM time slots or strobes of a strobe cycle having a plurality of strobes. During a time slot, where a die is associated with the time slot, the die is allowed to consume the peak power. If the operation is incomplete during the time slot, the operation is continued during the next TD-PPM time slot that is assigned to the die. For example, Die0 is allotted time slot 0 and Die1 is allotted time slot 1. During time slot 0, an operation is performed to Die0. However, the operation is incomplete when the next time slot (time slot 1) occurs. The operation to Die0 is paused until time slot 0 occurs again, where the operation is resumed when time slot 0 occurs again. Thus, when the TD-PPM time slots are cyclic incremented, a die may need to wait for its next assigned time slot to continue an operation even when the operation is a high-priority task or when other dies associated with the other time slots are not active, which may cause unnecessarily pauses in performing data storage device operations.

Figure 6:
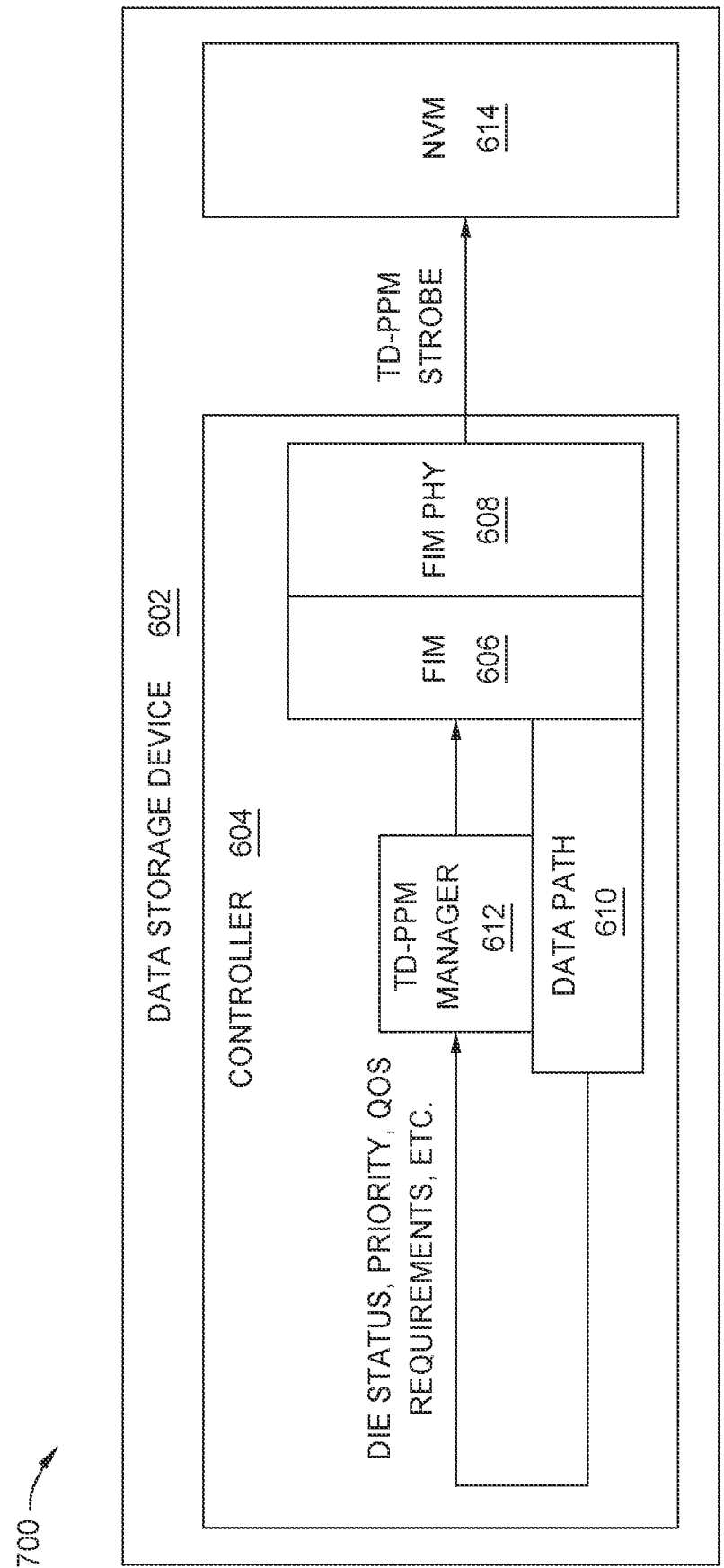
FIG. 6 is an exemplary illustration of a data storage device having a TD-PPM manager managing a TD-PPM strobe, according to certain embodiments.

FIG. 6 is an exemplary illustration of a data storage device 602 having a TD-PPM manager 612 managing a TD-PPM strobe, according to certain embodiments. The data storage device 602 includes a controller 604 and an NVM 614. The controller 604 may be the controller 108 of FIG. 1 and the NVM 614 may be the NVM 110 of FIG. 1. The controller 604 includes a flash interface module (FIM) 606 configured to read data from and write data to the NVM 110, a FIM physical layer (PHY) 608 coupled to the FIM 606, where the FIM PHY 608 is configured to assert the TD-PPM strobe to the NVM 614, a data path 610 coupled to the FIM 606, and the TD-PPM manager 612 coupled to the data path 610 and the FIM 606.

The TD-PPM manager 612 receives, from the data path 610, one or more of a die status, a priority, a quality of service (QoS) requirement of the commands associated with the data being processed by the data path 610, a current workload associated with each die, a number of pending operations in each die, a type of operation of any pending operations in each die, and the like. In other words, the TD-PPM manager 612 receives hints or indications from the data path 610 regarding the die usage of the NVM 614.

The TD-PPM manager 612 may dynamically determine which channels of a plurality of channels of the FIM 606 needs additional power. For example, when the TD-PPM manager 612 detects that the current scheme is sub-optimal to a current workload, the TD-PPM manager 612 may adjust the TD-PPM state and die mapping to have more power allocated to the channel that needs additional power. A TD-PPM state may refer to which strobe of the plurality of strobes of a strobe cycle is activated, such that power is provided during that strobe and data may be transferred during that strobe. The die mapping matches a die to a corresponding strobe that receives power or is activated. In other words, power of a die of a different channel may remapped to a die of the channel that needs additional power, where the strobe of the die of the different channel may be the same strobe of the die of the channel needs additional power. Thus, the TD-PPM manager 612 may cause the FIM PHY 608 to assert a plurality of adjusted strobe cycles, where the plurality of adjusted strobe cycles may be unbalanced towards one or more strobe cycles of the plurality of strobe cycles so that more power may be allocated to one or more strobe cycles than another one or more strobe cycles.

Figure 7:
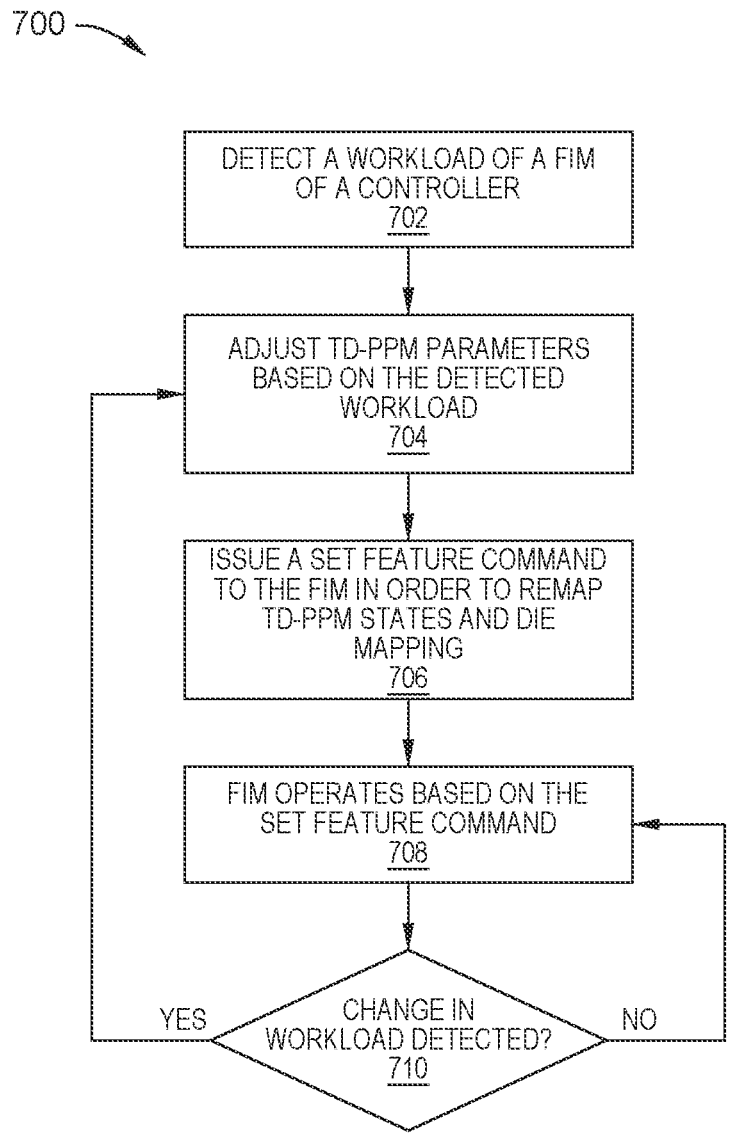
FIG. 7 is a flow diagram illustrating a method of operating a flash interface module, according to certain embodiments.

FIG. 7 is a flow diagram illustrating a method 700 of operating a flash interface module, according to certain embodiments. Method 700 may be implemented by a controller, such as the controller 108 of FIG. 1 or the controller 604 of FIG. 6, or by a TD-PPM manager, such as the TD-PPM manager 612 of FIG. 6. For exemplary purposes, aspects of the storage system 100 of FIG. 1 may be referenced herein.

At block 702, the controller 108 detects a workload of a FIM, such as the FIM 606 of FIG. 6. At block 704, the controller 108 adjusts the relevant TD-PPM parameters based on the detected workload of the FIM 606. Adjusting the relevant TD-PPM parameters may include remapping TD-PPM states and die mappings. At block 706, the controller 108 issues a set feature command to the FIM 606 in order to remap the TD-PPM states and the die mapping according to the adjusted TD-PPM parameters. At block 708, the FIM 606 operates based on the set feature command, such that that the plurality of channels of the FIM may be unbalanced, such that one or more channels may receive more power than one or more other channels. In other words, the traffic towards the one or more channels that receives more power than the one or more other channels may be greater than the traffic of the one or more other channels. As a result, more strobes of the strobe cycles corresponding to the one or more channels that receives more power may be associated with active dies having power asserted during the corresponding strobe. At block 710, the controller 108 determines if there has been a change in workload. For example, a change in workload may include one or more of a change in type of access to the NVM 110, such as random reads, random writes, sequential read, or sequential writes, a change in which dies are active, a change in which dies are inactive, and the like. If there has not been a change in the workload at block 710, then method 700 returns to block 708. However, if there has been a change in the workload at block 710, then method 700 returns to block 704.

Figure 8:
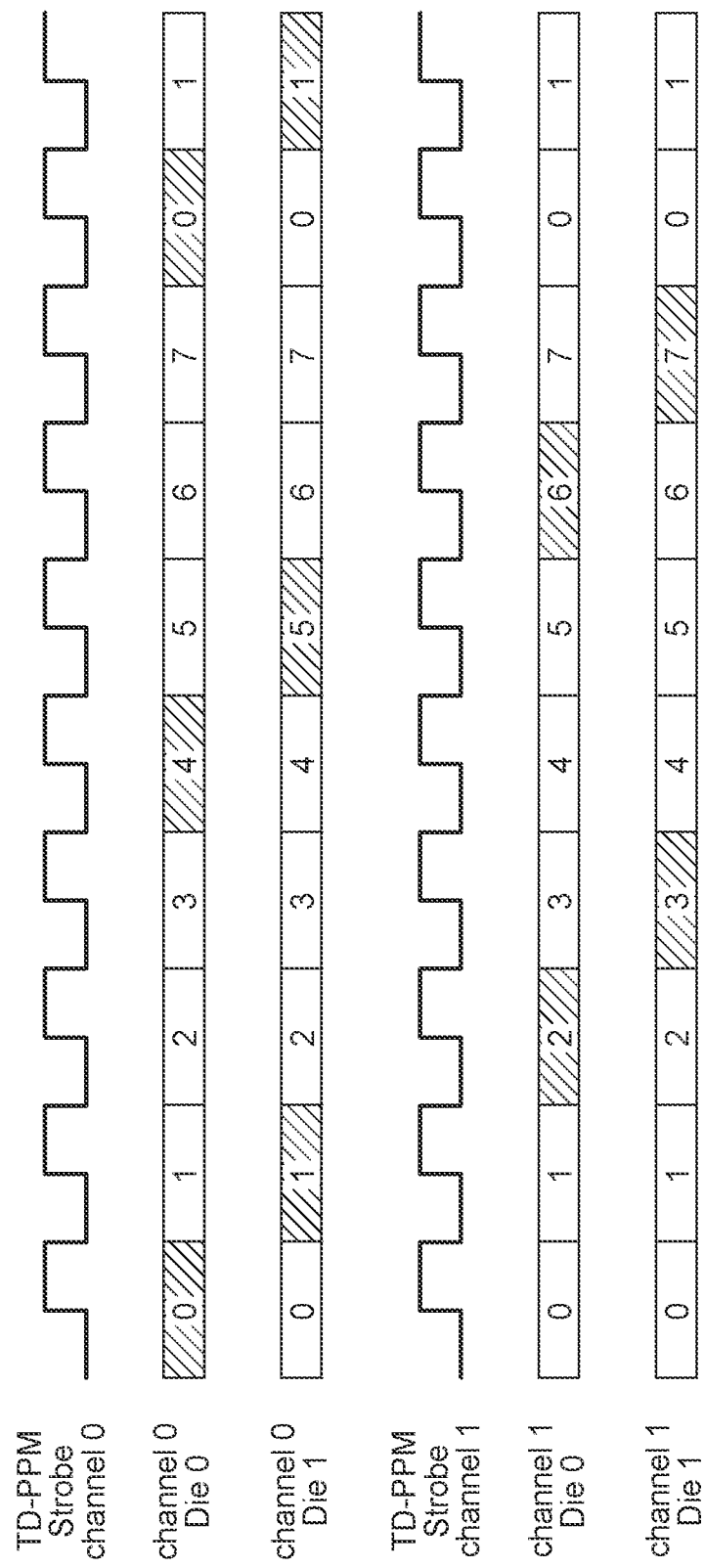
FIG. 8 is an exemplary illustration of die power consumption, according to certain embodiments.

FIG. 8 is an exemplary illustration of die power consumption, according to certain embodiments. FIG. 8 illustrates two strobe channels, Channel 0 and Channel 1, each with a first die, Die 0, and a second die, Die 1. Furthermore, FIG. 8 illustrates a balanced system, where power is allocated equally between Channel 0 and Channel 1. Referring to Channel 0, Die 0 is associated with strobe 0 and strobe 4, such that Die 0 may be allocated power or utilize peak power during strobe 0 and strobe 4. In other words, internal NAND operations associated with Die 0 may utilize peak power during strobe 0 and strobe 4. Likewise, Die 1 is associated with strobe 1 and strobe 5, such that Die 1 may be allocated power or utilize peak power during strobe 1 and strobe 5. In other words, internal NAND operations associated with Die 1 may utilize peak power during strobe 1 and strobe 5. Referring to Channel 1, Die 0 is associated with strobe 2 and strobe 6, such that Die 0 may be allocated power or utilize peak power during strobe 2 and strobe 6. In other words, internal NAND operations associated with Die 0 may utilize peak power during strobe 2 and strobe 6. Likewise, Die 1 is associated with strobe 3 and strobe 7, such that Die 1 may be allocated power or utilize peak power during strobe 3 and strobe 7. In other words, internal NAND operations associated with Die 1 may utilize peak power during strobe 3 and strobe 7.

Figure 9:
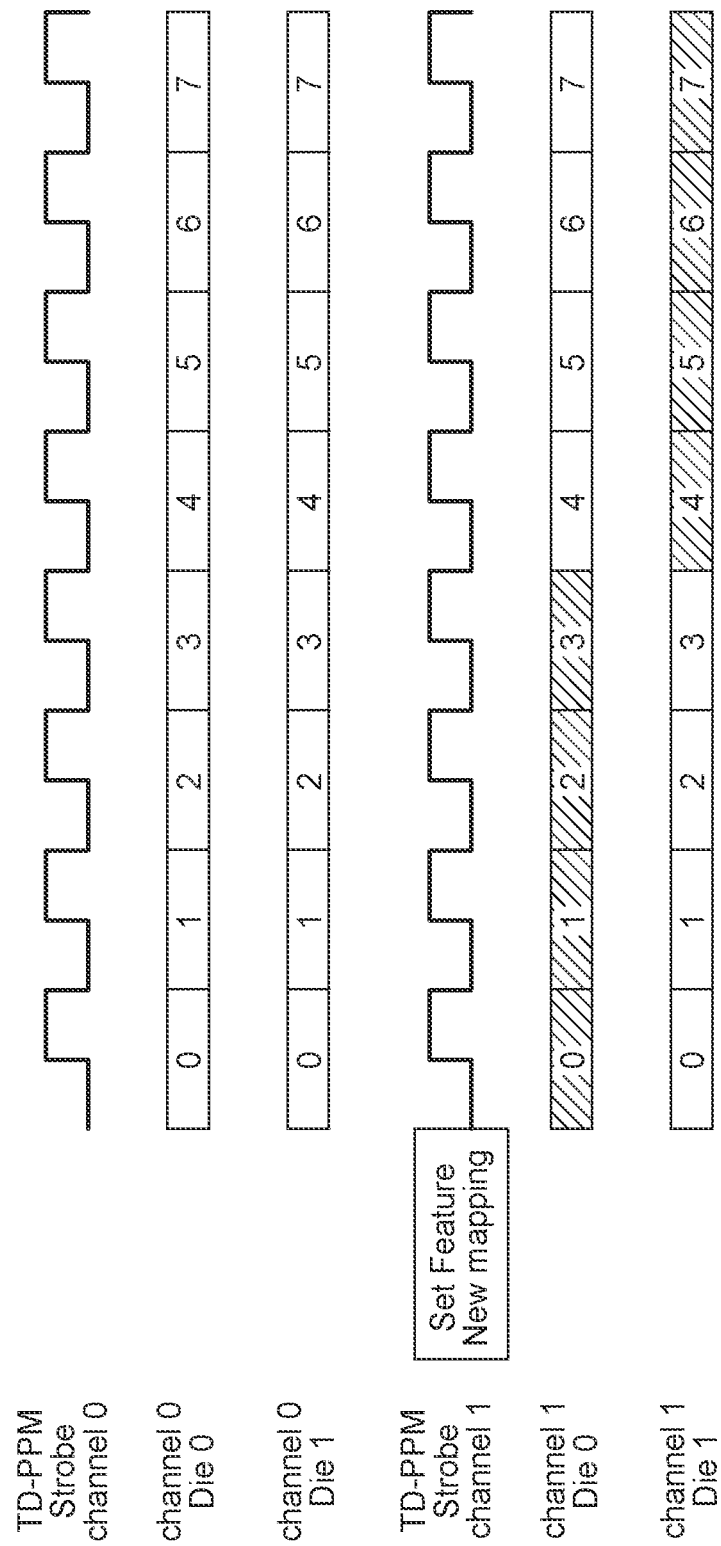
FIG. 9 is an exemplary illustration of die power consumption, according to certain embodiments.

FIG. 9 is an exemplary illustration of die power consumption, according to certain embodiments. FIG. 9 illustrates two strobe channels, Channel 0 and Channel 1, each with a first die, Die 0, and a second die, Die 1. Furthermore, FIG. 9 illustrates an unbalanced system, where power is allocated unequally between Channel 0 and Channel 1, which be an adjusted plurality of strobe cycles of the plurality of strobe cycles of FIG. 8. The plurality of strobe cycles of FIG. 9 is unbalanced due to a set feature command, which may be the set feature command issued at block 706 of method 700 of FIG. 7. For example, based on the workload determined at block 702 of method 700 of FIG. 7, a controller, such as the controller 604 of FIG. 4, may generate the set feature command to provide more power to Channel 1 due to the difference in traffic (e.g., workload) between Channel 0 and Channel 1.

Furthermore, the controller 108 may cause a plurality of sequential strobes of strobe cycle of a channel to be active for a single die rather than having sequential strobes being associated with different dies. Likewise, the controller 108 may determine to change an association of a strobe based on whether the strobe will cause sequential strobes to be associated with a single die or multiple dies.

Referring to Channel 0, Channel 0 does not have a strobe cycle occurring (i.e., the corresponding signal is tied to a "high" value). Thus, Die 0 and Die 1 are not associated with any strobes of the strobe cycle. In other words, Channel 0 may be inactive. Therefore, Channel 0, Die 0 and Die 1 may not utilize peak power while completing internal NAND operations associated with Channel 0, Die 0 and Die 1. Referring to Channel 1, Die 0 is associated with strobe 0, strobe 1, strobe 2, and strobe 3, such that Die 0 may be allocated power or utilize peak power during strobe 0, strobe 1, strobe 2, and strobe 3. In other words, internal NAND operations associated with Die 0 may utilize peak power during strobe 0, strobe 1, strobe 2, and strobe 3. Likewise, Die 1 is associated with strobe 4, strobe 5, strobe 6, and strobe 7, such that Die 1 may be allocated power or utilize peak power during strobe 4, strobe 5, strobe 6, and strobe 7. In other words, internal NAND operations associated with Die 1 may utilize peak power during strobe 4, strobe 5, strobe 6, and strobe 7.

Figure 10:
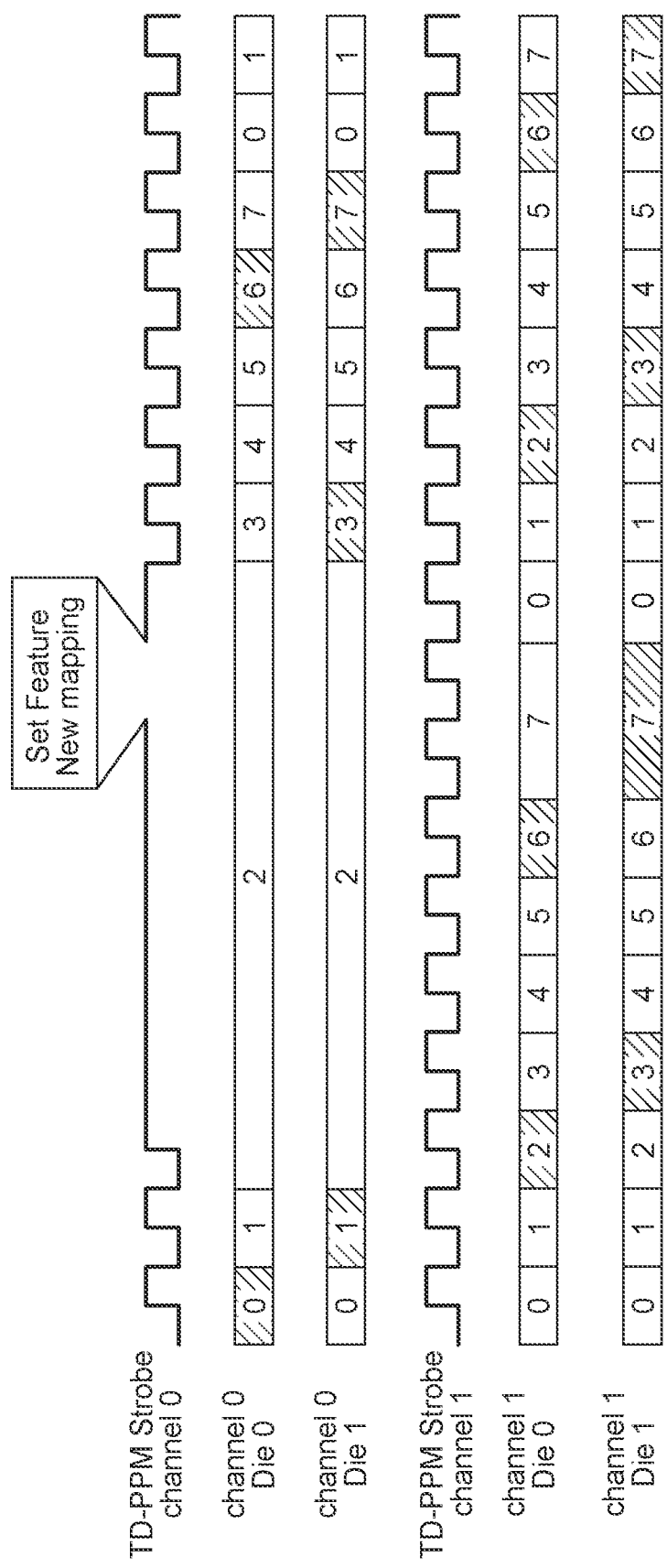
FIG. 10 is an exemplary illustration of die power consumption, according to certain embodiments.

FIG. 10 is an exemplary illustration of die power consumption, according to certain embodiments. FIG. 10 illustrates two strobe channels, Channel 0 and Channel 1, each with a first die, Die 0, and a second die, Die 1. Furthermore, FIG. 10 illustrates an unbalanced system, where power is allocated unequally between Channel 0 and Channel 1, which be an adjusted plurality of strobe cycles of the plurality of strobe cycles of FIG. 8. The plurality of strobe cycles of FIG. 10 is unbalanced due to a set feature command, which may be the set feature command issued at block 706 of method 700 of FIG. 7. For example, based on the workload determined at block 702 of method 700 of FIG. 7, a controller, such as the controller 604 of FIG. 4, may generate the set feature command to provide more power to Channel 1 due to the difference in traffic (e.g., workload) between Channel 0 and Channel 1.

Referring to Channel 0, Die 0 is associated with strobe 0 and strobe 4, such that Die 0 may be allocated power or utilize peak power during strobe 0 and strobe 4. In other words, internal NAND operations associated with Die 0 may utilize peak power during strobe 0 and strobe 4. Likewise, Die 1 is associated with strobe 1 and strobe 5, such that Die 1 may be allocated power or utilize peak power during strobe 1 and strobe 5. In other words, internal NAND operations associated with Die 1 may utilize peak power during strobe 1 and strobe 5. However, at strobe 2, Channel 0 becomes inactive or disabled, such that the strobe cycle associated with Channel 0 is paused. Thus, prior to Channel 0 becoming active, internal NAND operations associated with Die 0 may utilize peak power during strobe 0 and during strobe 1. Referring to Channel 1, Die 0 is associated with strobe 2 and strobe 6, such that Die 0 may be allocated power or utilize peak power during strobe 2 and strobe 6. In other words, internal NAND operations associated with Die 0 may utilize peak power during strobe 2 and strobe 6. Likewise, Die 1 is associated with strobe 3 and strobe 7, such that Die 1 may be allocated power or utilize peak power during strobe 3 and strobe 7. In other words, internal NAND operations associated with Die 1 may utilize peak power during strobe 3 and strobe 7.

When Channel 0 is reactivated, the controller 604 may determine that a new workload is detected and issue a new set feature command to accommodate for the reactivation of Channel 0. In other words, when Channel 0 is reactivated, the first strobe to occur after reactivating may be associated with strobe 3 of Channel 0, which is different than the current strobe of Channel 1, strobe 1. Because Die 0 of Channel 0 is associated with strobe 5 and Die 1 of Channel 0 is associated with strobe 6, a misalignment occurs if power is provided to Die 0 of Channel 0 during strobe 5 when Channel 0 is reactivated. In other words, both Channel 0 Die 0 and Channel 1 Die 1 may be allocated power and/or use peak power during the corresponding strobe.

In order to avoid a misalignment (and, consequently, using a higher amount of power during a respective strobe of the plurality of strobe cycles), the controller 604 may issue a set feature command to remap the TD-PPM states and die mapping of Channel 0. For example, rather than Channel 0 Die 0 being associated with strobe 0 and strobe 5, Channel 0 Die 0 is associated with strobe 2 and 6. Likewise, rather than Channel 0 Die 1 being associated with strobe 1 and strobe 6, Channel 0 Die 1 is associated with strobe 3 and 7. Thus, a misalignment may not occur between two or more channels of the plurality of channels. In another example, Channel 0 may be reactivated at the same timing as when Channel 0 was disabled. In other words, Channel 0 may be reactivated when Channel 1 switches between strobe 2 and strobe 3 since the next strobe for Channel 0, prior to Channel 0 being disabled, is strobe 3. By reactivating the strobe of the disabled channel (i.e., Channel 0) at the same timing as when the strobe of the disabled channel was disabled, full synchronization may be achieved. However, additional strobes may pass in order to achieve the full synchronization, which may result in greater latency and complexity.

By dynamically adjusting TD-PPM parameters based on detected workloads to remap TD-PPM states and die mappings, performance and power optimization of a data storage device may be improved.

In one embodiment, a data storage device includes a memory device having a plurality of dies and a controller coupled to the memory device. The coupling includes a plurality of channels. Each channel of the plurality of channels includes a strobe cycle having a plurality of strobes. Each channel is associated with a distinct one or more dies of the plurality of dies. The distinct one or more dies of the plurality of dies are associated with one or more strobes of the plurality of strobes of a strobe cycle. The controller is configured to determine that a first channel requires additional power for one or more dies of the first channel, determine that a second channel has unused power for one or more dies of the second channel, where one or more strobes associated with the one or more dies of the second channel are distinct from one or more strobes associated with the one or more dies of the first channel, and remap the unused power from the second channel to the first channel.

The remapping includes providing power at a same strobe of the second channel to the first channel. The provided power is provided to one of the one or more dies of the first channel. The controller is further configured to send a set feature command to the plurality of channels. The set feature command comprises a time division peak power management (TD-PPM) state and die mapping. The controller is further configured to detect that a workload of the data storage device has changed. An amount of power provided to each channel of the plurality of channels is unbalanced. An amount of traffic of the first channel is greater than an amount of channel of the second channel. The controller is further configured to determine that a third channel, that is inactive, is reactivated and send a set mapping command to the plurality of channels. The set mapping command comprises a mapping of one or more dies to one or more strobes of the third channel. The one or more strobes of the third channel are distinct from the one or more strobes of the first channel and the one or more strobes of the second channel. The one or more strobes of the third channel, after reactivated, are different than the one or more strobes of the third channel prior to being inactivated. The controller is further configured to detect that the first channel is reactivated. The determining that the first channel requires additional power for the one or more dies of the first channel is in response to detecting that the first channel is reactivated.

In another embodiment, a data storage device includes a memory device having a plurality of dies and a controller coupled to the memory device. The coupling includes a plurality of channels. Each channel of the plurality of channels includes a strobe cycle having a plurality of strobes. Each channel is associated with a distinct one or more dies of the plurality of dies. The distinct one or more dies of the plurality of dies are associated with one or more strobes of the plurality of strobes of a strobe cycle. The controller is configured to detect a change in a workload of the data storage device, adjust one or more time division peak power management (TD-PPM) parameters, issue a set feature command to a flash interface module (FIM), and operate the plurality of channels using the adjusted one or more TD-PPM parameters.

The set feature command is configured to remap an association of a first die associated with a first pulse of a first channel to a second pulse of the first channel. The second pulse is either previously mapped to a second die associated with a different channel than the first channel or an unmapped pulse. Detecting a change in a workload of the data storage device further includes determining that more traffic is issued towards one or more channels than another one or more channels. At least one channel of the plurality of channels is disabled.

In another embodiment, a data storage device includes memory means and a controller coupled to the memory means. The controller is configured to change an association of a first strobe of a strobe cycle of a first channel associated with a first die of the first channel to a first strobe of the strobe cycle of a second channel associated with a first die of the second channel.

The changing is in response to controller detecting that an amount of traffic associated with the first channel and an amount of traffic associated with the second channel has changed. The first strobe of the first channel associated with the first die is either an initial strobe or a last strobe in a sequence of strobes associated with the first die of the first channel.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory device having a plurality of dies; and
a controller coupled to the memory device, wherein:
the coupling comprises a plurality of channels;
each channel of the plurality of channels comprises a strobe cycle having a plurality of strobes;
each channel is associated with a distinct one or more dies of the plurality of dies; and the distinct one or more dies of the plurality of dies are associated with one or more strobes of the plurality of strobes of a strobe cycle, wherein the controller is configured to:
   determine that a first channel requires additional power for one or more dies of the first channel;
   determine that a second channel has unused power for one or more dies of the second channel, wherein one or more strobes associated with the one or more dies of the second channel are distinct from one or more strobes associated with the one or more dies of the first channel; and
   remap the unused power from the second channel to the first channel.

2. The data storage device of claim 1, wherein the remapping comprises providing power at a same strobe of the second channel to the first channel.

3. The data storage device of claim 2, wherein the provided power is provided to one of the one or more dies of the first channel.

4. The data storage device of claim 1, wherein the controller is further configured to send a set feature command to the plurality of channels.

5. The data storage device of claim 4, wherein the set feature command comprises a time division peak power management (TD-PPM) state and die mapping.

6. The data storage device of claim 1, wherein the controller is further configured to detect that a workload of the data storage device has changed.

7. The data storage device of claim 1, wherein an amount of power provided to each channel of the plurality of channels is unbalanced.

8. The data storage device of claim 1, wherein an amount of traffic of the first channel is greater than an amount of channel of the second channel.

9. The data storage device of claim 1, wherein the controller is further configured to:
   determine that a third channel, that is inactive, is reactivated; and
   send a set mapping command to the plurality of channels, wherein the set mapping command comprises a mapping of one or more dies to one or more strobes of the third channel, wherein the one or more strobes of the third channel are distinct from the one or more strobes of the first channel and the one or more strobes of the second channel.

10. The data storage device of claim 9, wherein the one or more strobes of the third channel, after reactivated, are different than the one or more strobes of the third channel prior to being inactivated.

11. The data storage device of claim 1, wherein the controller is further configured to detect that the first channel is reactivated.

12. The data storage device of claim 11, wherein the determining that the first channel requires additional power for the one or more dies of the first channel is in response to detecting that the first channel is reactivated.

13. A data storage device, comprising:
a memory device; and
a controller coupled to the memory device, wherein:
   the coupling comprises a plurality of channels;
   each channel of the plurality of channels comprises a strobe cycle having a plurality of strobes;
   each channel is associated with a distinct one or more dies of the plurality of dies; and
   the distinct one or more dies of the plurality of dies are associated with one or more strobes of the plurality of strobes of a strobe cycle, wherein the controller is configured to:
      detect a change in a workload of the data storage device;
      adjust one or more time division peak power management (TD-PPM) parameters;
      issue a set feature command to a flash interface module (FIM); and
      operate the plurality of channels using the adjusted one or more TD-PPM parameters.

14. The data storage device of claim 13, wherein the set feature command is configured to remap an association of a first die associated with a first pulse of a first channel to a second pulse of the first channel.

15. The data storage device of claim 14, wherein the second pulse is either:
   previously mapped to a second die associated with a different channel than the first channel; or
   an unmapped pulse.

16. The data storage device of claim 13, wherein detecting a change in a workload of the data storage device further comprises determining that more traffic is issued towards one or more channels than another one or more channels.

17. The data storage device of claim 13, wherein at least one channel of the plurality of channels is disabled.

18. A data storage device, comprising:
memory means; and
a controller coupled to the memory means, wherein the controller is configured to:
   change an association of a first strobe of a strobe cycle of a first channel associated with a first die of the first channel to a first strobe of the strobe cycle of a second channel associated with a first die of the second channel.

19. The data storage device of claim 18, wherein the changing is in response to controller detecting that an amount of traffic associated with the first channel and an amount of traffic associated with the second channel has changed.

20. The data storage device of claim 18, wherein the first strobe of the first channel associated with the first die is either an initial strobe or a last strobe in a sequence of strobes associated with the first die of the first channel.

* * * * *